United States Patent
England

(10) Patent No.: US 7,006,015 B2
(45) Date of Patent: *Feb. 28, 2006

(54) ELECTRONIC DEVICE WITH HIDDEN KEYBOARD

(75) Inventor: David G. England, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/991,828

(22) Filed: Nov. 21, 2001

(65) Prior Publication Data

US 2002/0039074 A1 Apr. 4, 2002

Related U.S. Application Data

(63) Continuation of application No. 09/219,925, filed on Dec. 21, 1998.

(51) Int. Cl.
G06F 1/16 (2006.01)

(52) U.S. Cl. .................. 341/22; 341/20; 345/168; 361/686; 361/681

(58) Field of Classification Search .................. 341/20, 341/22; 345/168, 173; 361/680, 681, 683; D14/138
See application file for complete search history.

(56) References Cited

U.S. PATENT DOCUMENTS

| 5,128,662 A | 7/1992 | Failla |
| 5,278,779 A | 1/1994 | Conway et al. |
| 5,434,964 A | 7/1995 | Moss et al. |
| 5,440,502 A | 8/1995 | Register |
| 5,494,447 A * | 2/1996 | Zaidan ................... 439/31 |
| 5,548,478 A * | 8/1996 | Kumar et al. ............ 361/681 |
| 5,594,619 A * | 1/1997 | Miyagawa et al. ....... 361/681 |
| 5,644,469 A | 7/1997 | Shioya |
| 5,668,570 A * | 9/1997 | Ditzik .................... 345/173 |
| 5,712,760 A | 1/1998 | Coulon et al. |
| 5,808,862 A * | 9/1998 | Robbins ................. 361/681 |
| 5,818,701 A * | 10/1998 | Shindo ................... 361/814 |
| 5,821,881 A | 10/1998 | Fischer et al. |
| 5,900,848 A * | 5/1999 | Haneda et al. .......... 345/1.1 |
| 6,005,767 A * | 12/1999 | Ku et al. ................. 361/681 |
| 6,064,373 A * | 5/2000 | Ditzik .................... 345/173 |
| 6,249,672 B1 * | 6/2001 | Castiel .................. 455/575.4 |
| 6,308,084 B1 * | 10/2001 | Lonka ................... 455/556.1 |
| 6,351,372 B1 * | 2/2002 | Kim ....................... 361/683 |
| 6,384,811 B1 * | 5/2002 | Kung et al. ............. 345/168 |
| 6,392,871 B1 * | 5/2002 | Yanase ................... 361/681 |
| 6,532,147 B1 * | 3/2003 | Christ, Jr. .............. 361/683 |

* cited by examiner

FOREIGN PATENT DOCUMENTS

WO   PCT/US9926864   2/2000

OTHER PUBLICATIONS

"Clio the Ideal PC Companion from Vadem", Downloaded from www.vadem.com/clio/oindex.html on Mar. 31, 2000. 2 pages.

Primary Examiner—Albert K. Wong
(74) Attorney, Agent, or Firm—Rita M. Wisor

(57) ABSTRACT

A device includes a keyboard and a display. The keyboard allows entry of data into the device, and the display provides an information output. The display has a first position in which the display hides the keyboard, and the display has a second position in which the keyboard is exposed to allow entry of data via the keyboard. The display is visible to the user in both the first position and the second position.

8 Claims, 5 Drawing Sheets

ELECTRONIC DEVICE WITH HIDDEN KEYBOARD

This is a continuation of application Ser. No. 09/219,925, filed on Dec. 21, 1998.

BACKGROUND OF THE INVENTION

1. Field of the Invention

The described invention relates to an electronic device providing a display output and allowing input via a keyboard or keypad.

2. Description of Related Art

Electronic devices employing display outputs include personal digital assistants (PDA's), palm PC's (such as the Palm Pilot device manufactured by 3COM), still and video cameras, two-way pagers, and so forth. In many cases, a few navigation buttons are used to allow a user to maneuver through displayed data. These electronic devices, however, may have real estate (i.e., area) limitations that may not allow for both a keyboard/keypad and a display output. Handheld devices especially may have these real estate constraints.

If a device has real estate constraints and needs both a keyboard/keypad and a display, a compromise is made. One solution is to use a touch screen LCD to allow the input of text as well as to display images. If keyboard input is desired, a virtual keyboard is displayed on the touch screen LCD. A user can then input information via the virtual keyboard. However, this limits the portion of the touch screen LCD that can be used for displaying images (because a virtual keyboard is also being displayed).

A hinged device with a display output on one side and a keyboard on the other side is an alternate solution. This type of device allows both input from the keyboard, and simultaneous display of data and/or images. However, when the hinged device is closed, the user can no longer view displayed information from the display output.

SUMMARY OF THE INVENTION

A device includes a keyboard and a display. The keyboard allows entry of data into the device, and the display provides an information output. The display has a first position in which the display hides the keyboard, and the display has a second position in which the keyboard is exposed to allow entry of data via the keyboard. The display is visible to the user in both the first position and the second position.

BRIEF DESCRIPTION OF THE DRAWINGS

FIGS. 8A and 8B are side views. FIG. 8C is a top view.

DETAILED DESCRIPTION

An electronic device having a display that is capable of concealing a keyboard is disclosed. In a "read mode" the display is visible to a user, but the display conceals the keyboard. This mode allows easy access to data and images via the display. When the display is moved to a "full input/output (I/O) mode", the display is still visible to a user, but the display no longer conceals the keyboard. This mode allows the user to input information via the keyboard as well as view information output from the display.

Figure 1:
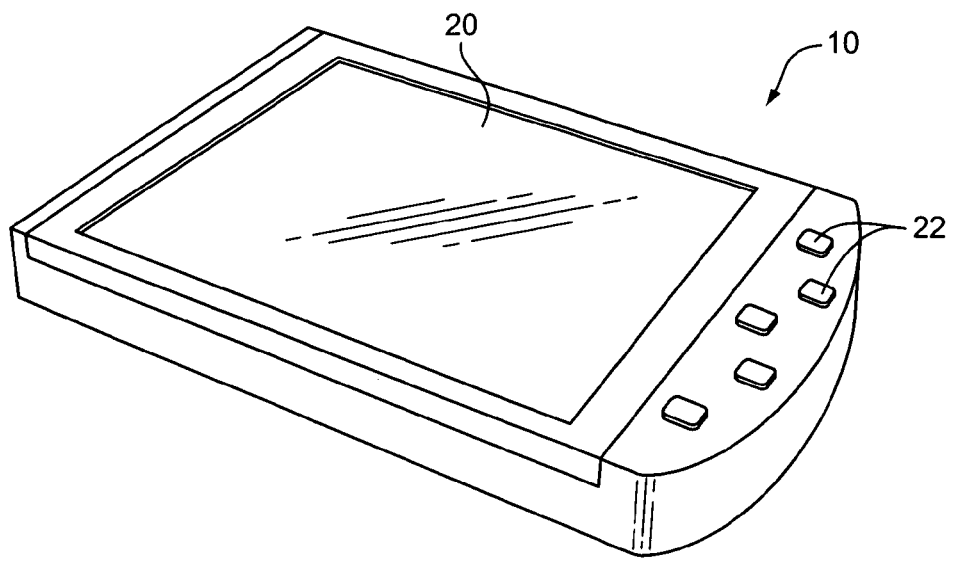
FIG. 1 shows one embodiment of an electronic device in a read only mode.

FIG. 1 shows a prior art example of an electronic device 10 having a display 20 and maneuver buttons 22. A user is able to view information on the display 20, and the maneuver buttons 22 allow limited input for scrolling through data. The information displayed may compromise pictorial information (images) or textual information (names, appointments, etc.).

The "read mode" of the present invention acts the same as that of the prior art FIG. 1. This read mode allows the user to conveniently access information and images from the electronic device 10.

Figure 2:
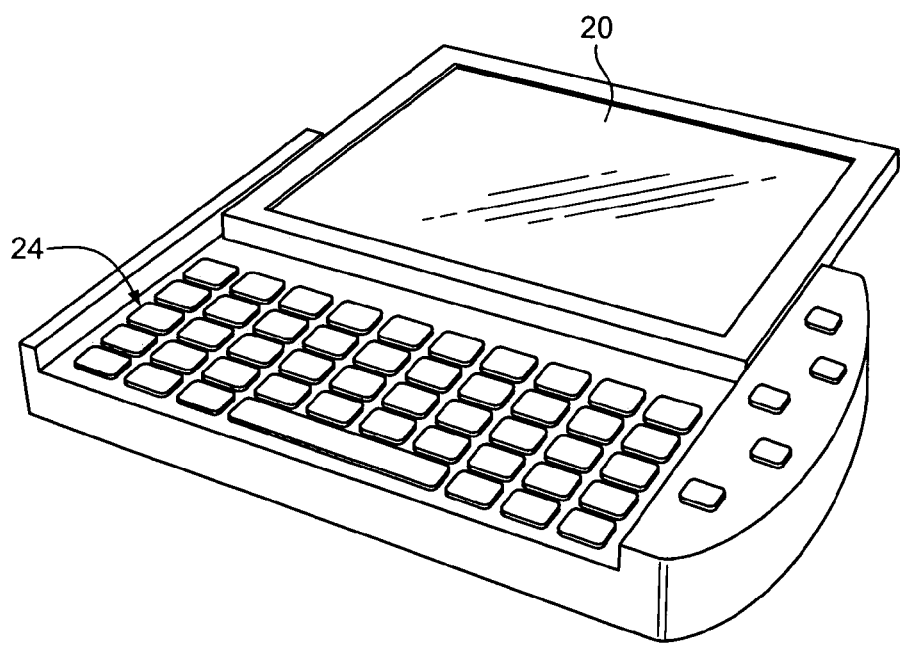
FIG. 2 shows one embodiment of an electronic device in a full I/O mode.

FIG. 2 shows one embodiment of the present invention in its "full I/O mode." This mode is achieved by moving the display 20 so that it no longer conceals a keyboard/keypad 24. The keyboard/keypad 24 may provide a full character set including all letters, numbers and special characters such as that of a typewriter or computer keyboard; or the keyboard/keypad 24 may provide a simplified character set such as the keypad of a touch-tone telephone. The term keyboard will be used to denote a full character set keyboard, or any subset of a full character set keyboard in which selection of a particular button corresponds to the input of a character (alphanumeric or special character). In both the read mode and the full I/O mode, the display output is visible to the user.

Figure 3:
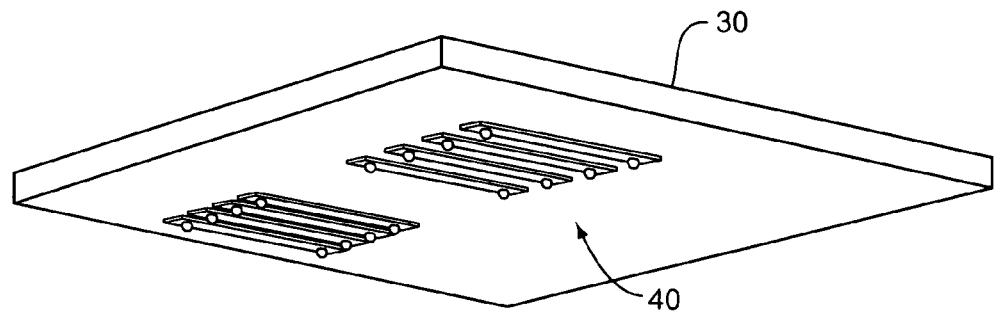
FIG. 3 shows one embodiment of the display portion of the present invention.
Figure 4:
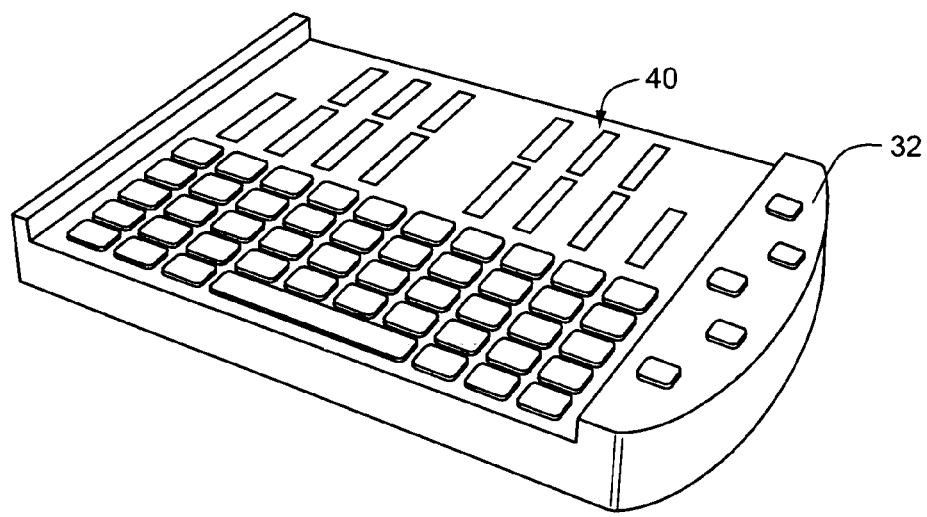
FIG. 4 shows one embodiment of a base portion corresponding to the display portion of FIG. 3.

FIG. 3 shows one embodiment of the display portion 30 of the present invention, and FIG. 4 shows one embodiment of a corresponding base portion 32 of the present invention. In this embodiment, the display portion 30 and base portion 32 include several electrical contacts 40 that provide an electrical connection between the display portion 30 and the base portion 32.

In one embodiment, the display portion 30 is a liquid crystal display (LCD), and the base portion 32 houses a processor, memory, and power source (batteries). However, in an alternative embodiment, the processor, memory and/or power source could be moved into the display portion. The power source could also be provided externally.

In one embodiment, the display portion 30 is coupled to the base portion 32 via a serial connection, such as an SPI* serial bus or an I²C* serial bus, which are well-known serial connections. (SPI is a serial bus developed by Motorola Incorporated as a peripheral interconnect standard. I²C is a serial bus developed by Philips Semiconductor.)

*Third party names and marks are property of thier respective owners.

Figure 5:
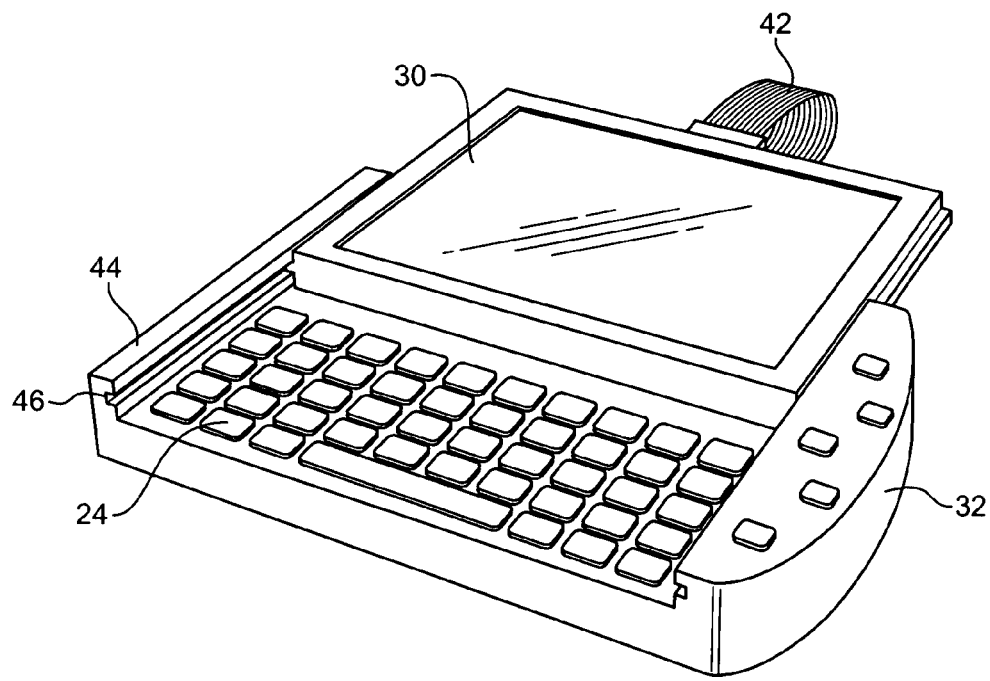
FIG. 5 shows an embodiment of electrically connecting the display portion to the base portion of the electrical device using a flexible connector.
Figure 6:
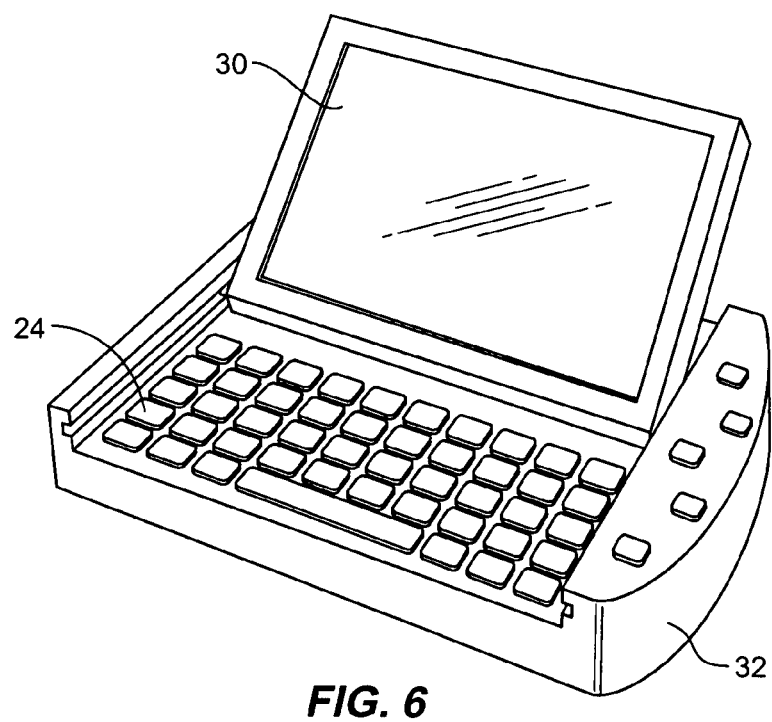
FIG. 6 shows an embodiment of mechanically connecting the display portion to the base portion using a sliding mechanical guide.

FIG. 5 shows another embodiment of electrically connecting the display portion 30 to the base portion 32 of the electrical device 10. In this embodiment, a flexible connector such as a ribbon cable 42 is connected between the display portion 30 and the base portion 32. A mechanical guide 46 such as grooves along the edges 44 of the base portion 32 (or display portion 30) is used to allow the display portion 30 to slidably move between the read mode and the full I/O mode. Rollers or ball bearings may be employed to allow freer movement within the mechanical guides. In one embodiment, the topside of the display portion 30 raises as its bottomside is moved within the mechanical guides to reveal the keyboard, as shown in FIG. 6.

Figure 7A:
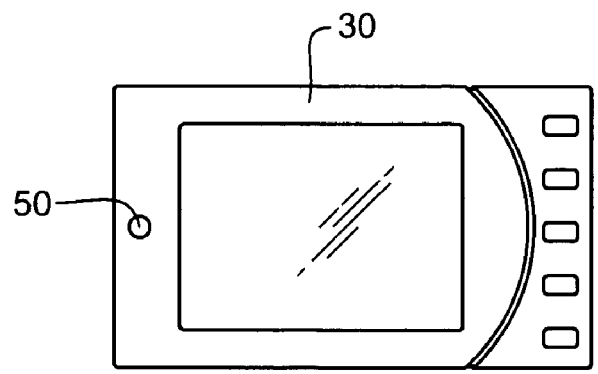
FIGS. 7A and 7B show an embodiment of a device that includes a display portion coupled to a base portion via a rod that allows the display portion to rotatably move to reveal the keyboard.
Figure 7B:
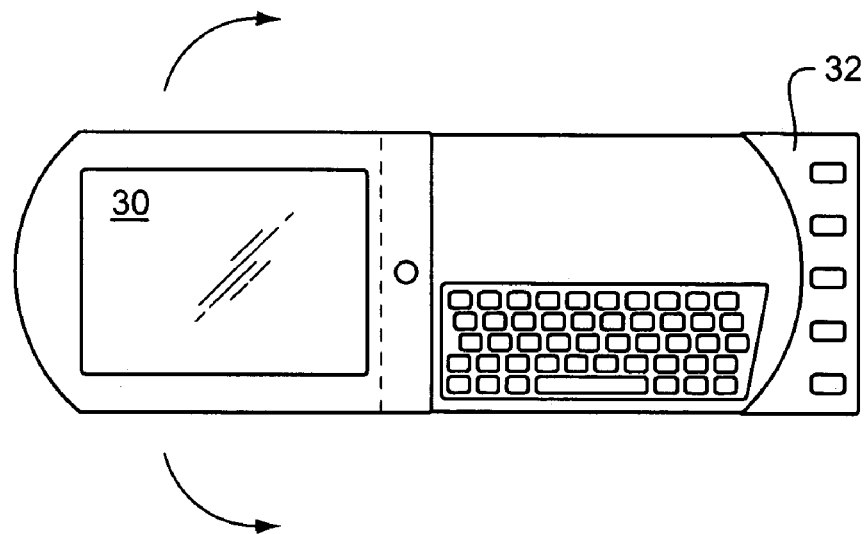

FIGS. 7A and 7B show an alternative embodiment of a device that includes a display portion 30 coupled to a base portion 32 via a rod 50 that allows the display portion 30 to rotatably move to reveal the keyboard 24. The display portion 30 may employ a curved side to allow rotatable movement. An electrical connection between the display portion 30 and the base portion 32 may be routed through the rod 50.

Figure 8A:
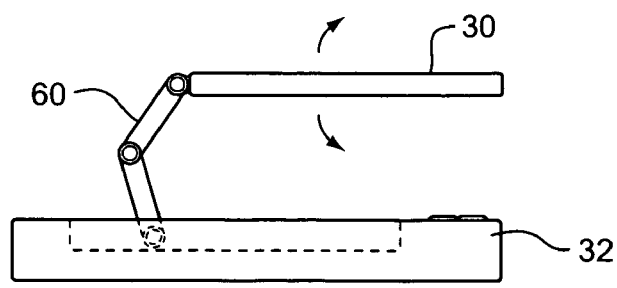
FIGS. 8A–8C show different views of an embodiment of mechanically connecting the display portion to the base portion using an arm.
Figure 8B:
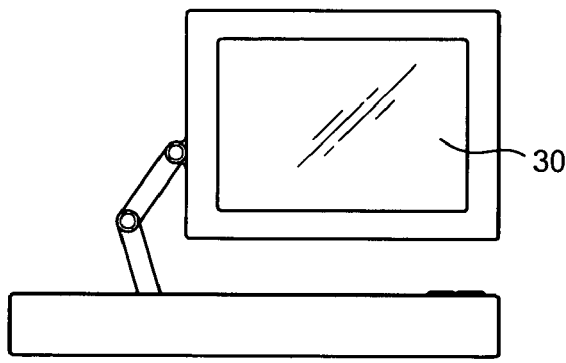
Figure 8C:
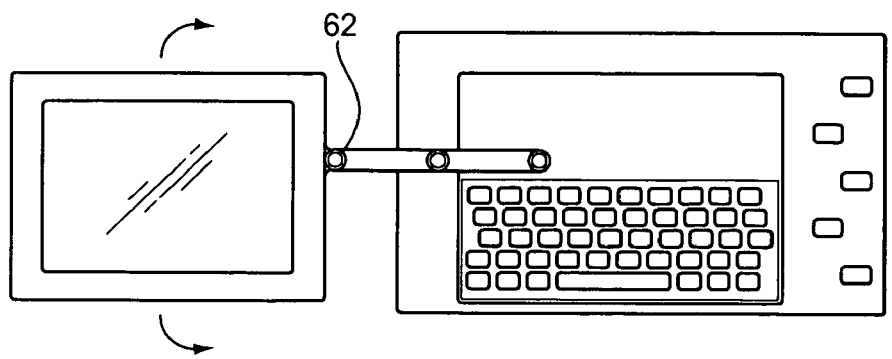

FIGS. 8A–8C show an alternative embodiment of mechanically connecting the display portion 30 to the base portion 32 using an arm 60. The arm 60 is bendable and swivels in various directions to allow the display portion 30 to be placed in different positions. An electrical connection from the display portion 30 to the base portion 32 is routed internal to the arm 60.

FIG. 8A shows a side view of the device having extendable arm 60. In its read mode, the device's display portion 30 fits within the base portion 32 as shown by the dotted lines. The display portion 30 can also be extended upwards and rotated so that the display faces the user, as shown in FIG. 8B. FIG. 8C shows a top view of the display portion 30 that has been extended outward and then rotated about pivot 62.

In one embodiment, contacts or sensors detect the position of the display portion 30 in order to present information to a user with the correct viewing orientation. For example, in the full I/O position of FIG. 7B, the device would need to display information using an orientation that is opposite to that of the read mode of FIG. 7A. Similarly, the device shown in FIGS. 8A–8C would need to detect the orientation of the display portion 30. This could be done by detecting the angle of rotation of the pivot points of the arm 60.

The present invention allows input via keyboard to a variety of different devices. For example, in one embodiment, a transmitter is added to communicate signals corresponding to characters input into the device via the keyboard, such as in a two-way pager or a cellular telephone application. In another embodiment, an optical system is added to capture one or more images, such as in a still or video camera application.

Thus, an electronic device having a display that conceals a keyboard is disclosed. The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A device comprising:
   a base comprising a keyboard comprising all character input buttons;
   a display that is mechanically and electrically coupled with the base and that comprises a viewing surface to display information, wherein the display has a first position that conceals the keyboard and the display has a second full input/output position that exposes the entire keyboard, wherein the viewing surface is visible in the first position and the second position, wherein the viewing surface remains substantially coplanar during movement of the display between the first position and the second position; and
   a single pivot point coupling the display with the base to allow the display to rotate between the first position and the second position.

2. The device of claim 1, wherein the single pivot point is a rod to allow the display to move in substantially a single plane.

3. The device of claim 2, wherein the rod directly connects the display to the base.

4. A device comprising:
   a base comprising a keyboard comprising all character input buttons;
   a display that is mechanically and electrically coupled with the base and that comprises a viewing surface to display information, wherein the display has a first position that conceals the keyboard and the display has a second full input/output position that exposes the entire keyboard, wherein the viewing surface is visible in the first position and the second position, wherein the viewing surface remains substantially coplanar during movement of the display between the first position and the second position; and
   a single arm connecting the display with the base to move the display between the first position and the second position, wherein the single arm bends at an interior point between a point of connection with the display and a point of connection with the base.

5. The device of claim 4, wherein the single arm comprises an interior joint.

6. The device of claim 5, wherein the arm comprises a sensor to detect an angle or rotation of the joint.

7. A device comprising:
   a base comprising a keyboard comprising all character input buttons;
   a display that is mechanically and electrically coupled with the base and that comprises a viewing surface to display information, wherein the display has a first position that conceals the keyboard and the display has a second full input/output position that exposes the entire keyboard, wherein the viewing surface is visible in the first position and the second position, wherein the viewing surface remains substantially coplanar during movement of the display between the first position and the second position; and
   a single arm connecting the display with the base to move the display between the first position and the second position, wherein the single arm has at least three degrees of freedom of movement.

8. The device of claim 7, wherein the arm has at least five degrees of freedom of movement.

* * * * *